Figure 1:
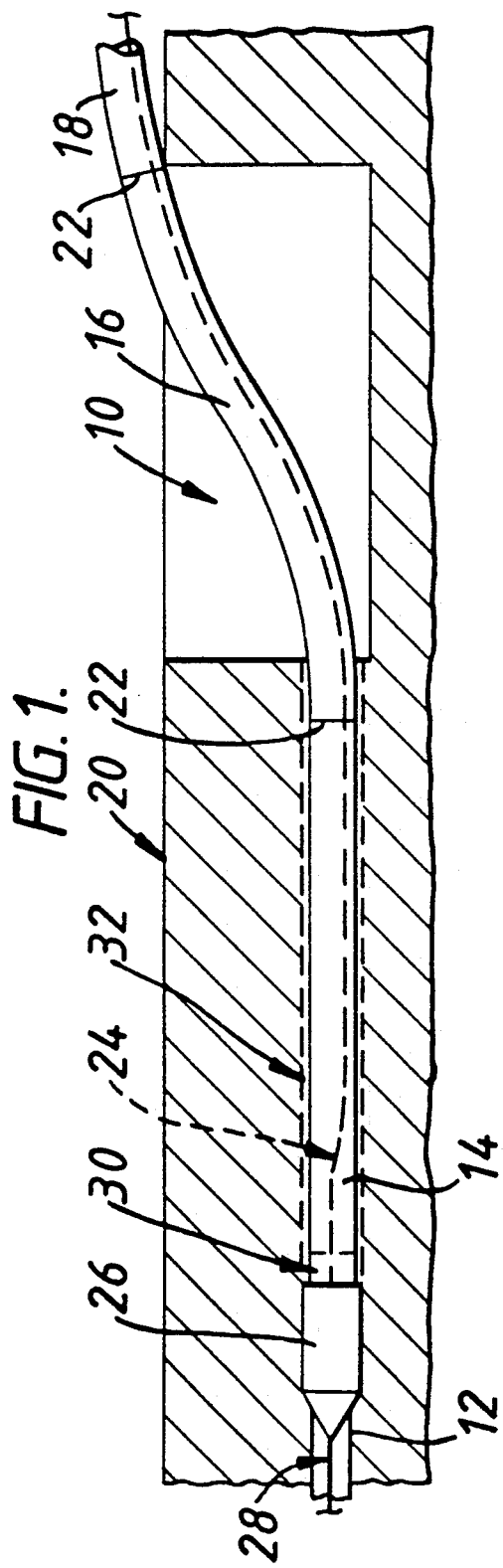

United States Patent [19]

Stafford

[11] Patent Number: 5,007,767

[45] Date of Patent: Apr. 16, 1991

[54] METHOD FOR JOINING POLYOLEFIN PIPES BY FUSION

[75] Inventor: Trevor G. Stafford, Tyne & Wear, England

[73] Assignee: British Gas Corporation, London, England

[21] Appl. No.: 246,243

[22] Filed: Sep. 19, 1988

Related U.S. Application Data

[63] Continuation of Ser. No. 884,940, Jul. 14, 1986, abandoned.

[51] Int. Cl.$^5$ ............................................. B65H 69/08
[52] U.S. Cl. ................................. 405/154; 156/304.2; 156/304.6; 156/309.6; 405/156; 405/169; 405/170
[58] Field of Search ...................... 156/304.2, 159, 158, 156/503, 499, 304.6, 309.6, 287; 138/97, 98, 120, 155; 405/154, 156, 169, 170; 428/36.92

[56] References Cited

U.S. PATENT DOCUMENTS

| | | | |
|---|---|---|---|
| 3,634,167 | 1/1972 | Plontke | 156/158 X |
| 3,998,682 | 12/1976 | Harmsen | 156/503 X |
| 4,273,605 | 6/1981 | Ross | 156/286 |
| 4,288,266 | 9/1981 | Konrad et al. | 156/304.6 X |
| 4,369,779 | 1/1983 | Spencer | 156/503 X |
| 4,484,975 | 11/1984 | McElroy | 156/304.6 X |
| 4,505,302 | 3/1985 | Streatfield et al. | 225/103 X |
| 4,640,732 | 2/1987 | Stafford | 156/158 X |
| 4,693,404 | 9/1987 | Wayman et al. | 225/103 |

OTHER PUBLICATIONS

ASTM Designation D-2657-79, "Standard Practice for Heat-Joining Polyolefin Pipe and Fittings".
"Guidelines for Piece Welding of Polyethylene Claddings of Factory Insulated Connections Employed in City Heating Pipeline Systems, Vesting City Heating Quality Assurance Commission", Publication—VES 85/19.
Alferink, et al., "Joining Methods for PE Casing Pipes of District Heating Systems" given at the Conference Plastics Pipes VI, which was held at York, England 26 to 28 Mar. 1985.
"Specification of Butt Welding for Pipes and Fittings of Polythene With a Density of at Least 930 KG/M$^3$" (Jan., 1985) VEG-GASINSTITUUT, The Netherlands.
"Welding of THermoplastics, PE-HD, Pipes and Pipeline Components for Gas and Water Mains" (Data Sheet DVS 2207, Part 1, May, 1984) DVS German Welding Society.
ASTM Designation D-2513-88b, "Standard Specification for Thermoplastic Gas Pressure Pipe, Tubing, and Fittings".

Primary Examiner—Caleb Weston
Assistant Examiner—Michele K. Yoder
Attorney, Agent, or Firm—Larson and Taylor

[57] ABSTRACT

A liner or other elongated duct is made by joining lengths of thin-walled polyethylene fusion. Typical thickness 2-4 mm, diameter 200 mm. Pipe ends are clamped in clamps which restore circularity. The ends are trimmed leaving aligned ends normal to pipe length. The clamps force the ends against a heated body, which is retracted and the ends are then forced together. The total heating period, say 15 seconds, and the periord between separation from the body and engagement of the ends, say 1 second, are very short. Good joint strengths and small beads result. The liner can be pulled into burst cast-iron gas main before a new main is passed through the liner; or the liner is a seal in a pipe. The method is applicable to other polyolefins e.g. polyropylene.

11 Claims, 2 Drawing Sheets

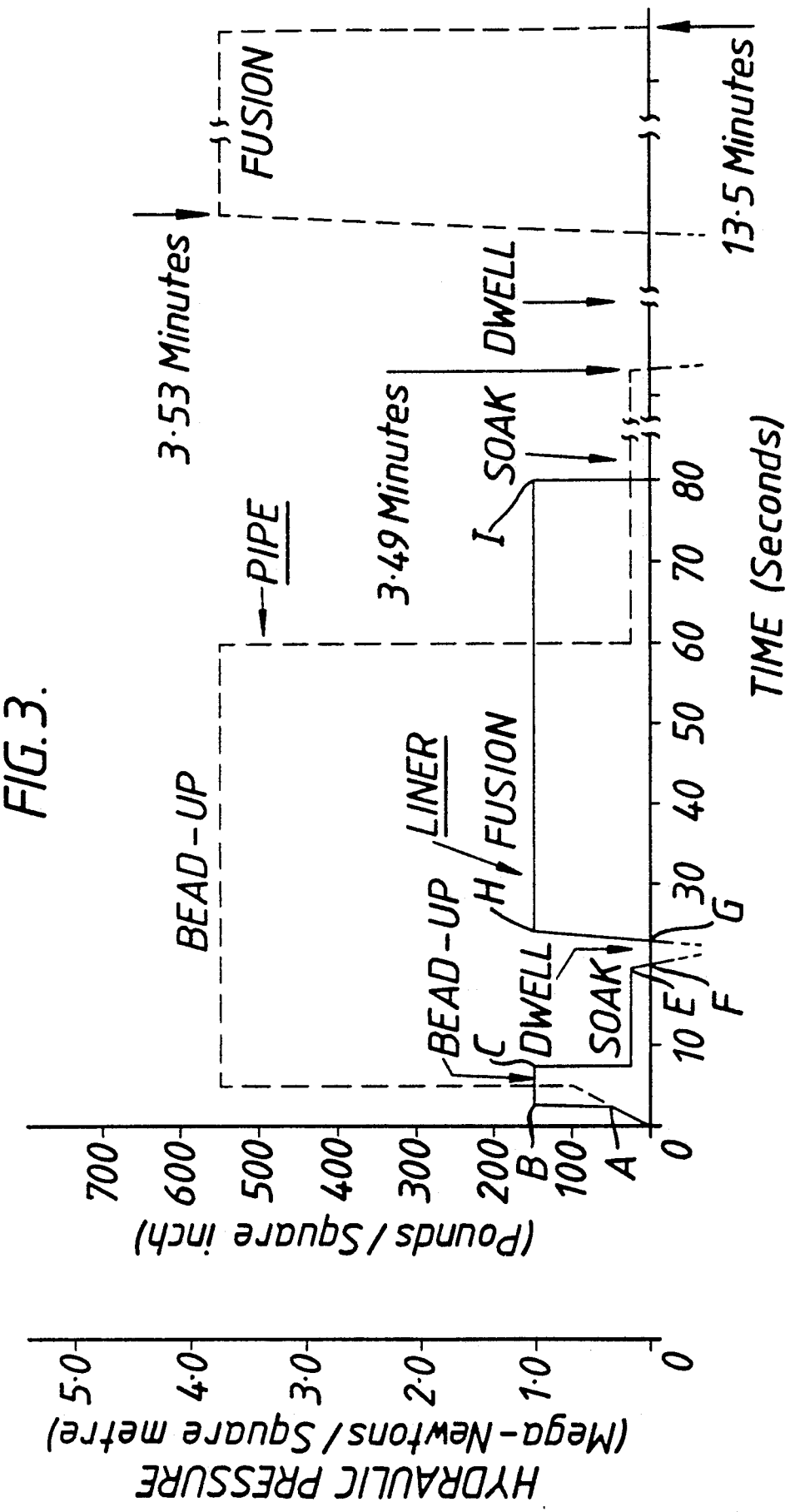

METHOD FOR JOINING POLYOLEFIN PIPES BY FUSION

This application is a continuation of co-pending application Ser. No. 06/884,940, filed July 14, 1986, now abandoned.

The invention relates to methods for joining pipes made of polyolefin plastic material.

The invention is particularly though not exclusively concerned with joining lengths of thin-walled high density polyethylene pipe typically 2.5 to 3.0 millimeters thick, for example. A typical use for such pipe is where a cast-iron gas main is burst by a burster tool which passes through the main and pulls the pipe into place as a liner in the passage so formed. The liner protects the new gas main, made up of joined lengths of polyolefin pipe, preferably polyethylene pipe, which is inserted through the liner.

It is already known to install a liner in a passage formed by passing a burster tool through a cast iron gas main. The lengths of liner pipe have sockets and tapers at their ends, which are inter-engaged. To advance the liner into the passage, a cup is engaged with the trailing end of the liner and connected to the trailing end of a cable which extends through the liner. The leading ends of the cable and of the liner are secured to the burster tool so that when the tool advances the liner is effectively pushed into the passage, as described in British Patent Specification No. 2092701.

The joining of thin-walled polyethylene pipe was considered in the paper "Joining Methods for PE Casing Pipes of District Heating Systems" given at the Conference Plastics Pipes VI, which was held at York, England 26 to 28 Mar. 1985.

The state of the art described in that paper shows that field joints between the straight lengths of pipe are made using extrusion welding. Furthermore, the use of butt fusion to join the thin-walled, polyethylene parts, which form fittings such as bends and branches, is restricted to the factory. Finally, the paper states that for such butt fusion joins the same conditions should be used as are currently established for thick-walled pipes of polyethylene.

The currently established conditions are very well known and are set out in such as the VEG specification of the Netherlands, the DVS 2207 specification of West Germany or the specifications prepared by the Applicant.

Those established conditions prescribe a relatively long total time during which the ends of the pipes to be joined engage the heater body and a relatively long period between the separation of the ends from the body and their mutual engagement.

Accordingly the external and internal beads at the joint, which result from the upset of the softened material of the pipes during the heating and joining periods, extend away from the pipes a relatively large distance.

The object of the invention is to provide a method of joining polyolefin pipe lengths in which the corresponding total time and period are relatively less and the beads extend away from the pipes a relatively smaller distance.

According to the invention, a method for fusion joining lengths of pipe made of polyolefin plastic material in which the wall thickness is in the range 2 to 4 millimeters and the ratio of the outside diameter to the wall thickness is at least 40:1 comprises closing respective aligned clamps on lengths of pipe adjacent the ends to be joined to reduce non-circularity of the ends and to hold the lengths, trimming the ends to leave trimmed ends more closely adjacent the respective clamps, the trimmed ends being substantially aligned and normal to the lengthwise direction of the lengths, reducing the distance between the clamps to force the trimmed ends against respective opposite faces of a heated body to form initial beads, reducing the pressure under which the ends engage the body faces, maintaining the ends in engagement with the body faces, separating the clamps to separate the ends from the body and retracting the body, and reducing the distance between the clamps to force the ends against each other to complete the beads, the total time during which the ends engage the body and the period between separation of the ends from the body and their engagement being short enough to ensure that the maximum distance which either bead extends away from the adjacent surface of the pipe wall is less than half the wall thickness. Preferably, the ends are forced against the body faces for a period not exceeding 10 seconds, after which the pressure is reduced and the ends continue to engage the body faces for a period not exceeding 15 seconds, the period between separation of the ends from the body and their engagement not exceeding 3 seconds and the ends being forced against each other for a period of at least 30 seconds.

Figure 2:
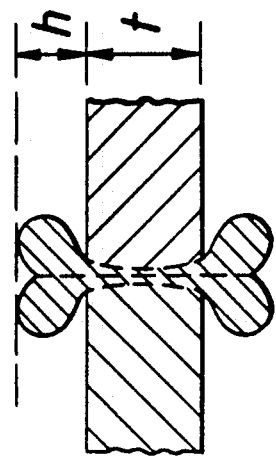

One way of carrying out the method will now be described by way of example with reference to the accompanying drawings, in which:

FIG. 1 is a schematic longitudinal vertical section through a liner showing a stage in its installation in a gas main being burst by a burster tool to which the liner is attached;

FIG. 2 is an enlarged schematic scrap section through parts of two beads at a joint in a liner, such as that shown in FIG. 1; and FIG. 3 is a diagram showing hydraulic pressure plotted as ordinate against time as abscissa (i) during the performance of the method used to join the pipe lengths to make the liner shown in FIG. 1; and (ii) during a known method using the conditions which have been established by the Applicant prior to the invention as applied to the joining of gas distribution pipe lengths of high-density polyethylene;

The embodiment of the invention to be described is an example of the use of the invention in making and installing a polyethylene liner in a passage formed by a burster tool, which advances through, and bursts, a cast-iron gas distribution main, forming a passage into which the liner is pulled by the burster tool. Subsequently, a replacement main of polyethylene pipe is inserted through the liner.

As the liner is pulled into the passage, the joints between the lengths of liner pipe bear substantial tensile and other loads caused by the tension in the liner and by bending and constriction of the liner.

The method of joining the lengths of pipe is preferably carried out using apparatus similar to that described in U.S. Pat. No. 4,640,732, issued Feb. 3, 1987, entitled "Apparatus for fusion joining of thermoplastic pipes".

The main part of the apparatus including the clamps and a device for trimming the pipe ends is available for example from Fusion Equipment Limited of Dronfield near Sheffield, England. The controller, which is required if automatic operation of the apparatus is to be used, is available, for example, from Integrated Hydraulics Limited, Leamington Spa, Warwickshire, England.

Such a controller is described in the U.S. Pat. No. 4,640,732 aforesaid and, according to present invention, although its use is not essential it is preferred to use it.

Typically, the lengths of pipe forming the liner are each 6 meters (19.7 feet) long and 202 millimeters (8 inches) in outside diameter. The wall thickness is 2.5 to 3.0 mm (0.10 to 0.12 inch). The pipes are composed of high density polyethylene. Lesser lengths can be cut from the standard lengths.

Examples of burster tools for use in bursting the cast-iron gas main are described in British Patent Specification No. 2092701. The procedure for installing the liner is as follows, reference being made to FIG. 1. Short trenches, one of which is shown at 10, are excavated to expose the ends of a length of cast-iron main 12 which is to be replaced. Lengths of polyethylene tube 14, 16, 18 are joined together end to end on the ground surface 20, as described further below, to form the liner. The joints between the lengths are indicated at 22. The service (e.g. air) hose 24 (or each service hose if there is more than one) is passed through the liner and connected to the burster tool 26, before it is positioned in one trench 10 ready to advance into the cast-iron main 12. The tool 26 is connected to a cable 28 extending through the main and connected to a winch (not shown) at the other trench. The tool 26 is guided or pulled through the main by the cable 28.

The liner is advanced endwise so that the leading end can deflect downwardly over the edge of the trench 10 and that end is clamped around a cylindrical spigot 30 at the rear of the tool 26. The tool 26 then advances into the main 12, bursting it progressively, to form a new passage 32 of greater diameter, through which the liner is drawn into its installed position by the tool 26.

The tool leaves the main in the other trench and is disconnected from the liner and from the service hose or hoses, each of which is withdrawn from the liner. Subsequently, a replacement gas main of polyethylene is pushed through the liner, which protects the new main from scoring and abrasion by the surfaces of the broken and expanded iron main 12.

Clearly, the liner is subjected to tensile and other forces as it is deflected downwardly over the edge of the trench 10 and as it is pulled into the passage formed by the tool 26.

The liner is not only forced to bend into a curved shape, but is deformed from a circular cross-sectional shape to a flattened oval cross-sectional shape, particularly at the edge of the trench 10. The liner is also subject to rubbing action against the remnants of the broken iron main 12 and must resist the potential tearing effect of those remnants.

The procedure for joining the lengths of pipe 14, 16, 18 . . . is given in the following description which should be read in conjunction with the description given in U.S. Pat. No. 4,640,732 aforesaid. In the case of each joint, the two lengths of pipe are clamped near to the ends to be joined in respective aligned clamps of the butt fusion machine described in that application.

Each clamp is circular and is split so as to be openable to allow entry of the pipe. Each clamp is closed onto the respective pipe length and manually closed up by tightening the screws connecting the two parts of the clamp. This action reduces the non-circularity of the pipe length which, when in a horizontal orientation, deforms under its own weight and adopts an oval cross-sectional shape.

Next, each pipe length end is trimmed using the trimming device forming part of the machine described in the application referred to above. Trimming leaves a trimmed end more closely adjacent the respective clamp (say within one centimeter for example) substantially to align the pipe wall of the other. Very good alignment in some 90% of the angular extent of the pipe wall is achieved. In the remaining 10% of the angular extent of the walls, the alignment is such that if butted together, the pipe ends would make at least some two thirds of complete matching contact. There is some slight belling of the pipe length ends but it is substantially the same in each pipe length.

The trimmer device is accurately locatable in the fusion machine so as to cut the end faces, by rotary cutting action, accurately normal to the lengthwise alignment direction of the pipe lengths.

Once the pipe lengths have been clamped in place and trimmed the subsequent operation of the machine is preferably automatic using the controller as explained in the patent application referred to above. FIG. 3 shows the regime followed in the case of the present invention.

Pressure is increased at a relatively lower rate at O - A in the hydraulic ram until one clamp moves towards the other, the electrically heated plate being positioned between the two pipe ends. The machine automatically records the pressure at which the clamp first moves so that the same pressure can automatically be applied again subsequently. Upon movement of the clamp, a relatively higher rate of increase of hydraulic pressure is imposed at A - B. The ends of the pipes engage opposite sides of the electrically heated plate and full pressure at B is subsequently reached, and is maintained at B - C, typically for 5 seconds, but preferably not exceeding 10 seconds.

The pipe ends heat up, soften and initial internal and external beads are formed at the end of each pipe under the applied hydraulic pressure of typically 0.7 to 1.0 Mega-Newtons/square meter (7 to 10 bar).

The plate is free to move transversely so that both pipe ends are forced against the plate by the single ram. After the "bead-up" stage B - C, the pressure is reduced, for example to 0.2 MN/m$^2$ (2 bar) and maintained at D - E, the "heat soak" stage, typically for 10 seconds, but preferably not exceeding 15 seconds.

After the "soak" stage, the ram is retracted to withdraw the pipe ends from the plate, which is automatically withdrawn from between the ends.

The ram again advances and brings the ends into engagement with each other. The period between the separation of the ends from the plate and their engagement with each other is called the "dwell" period F - G and is typically 1 second. The pressure increases after the ends engage to reach a maximum fusion pressure, typically 0.7 to 1.0 MN/m$^2$ (7 to 10 bar).

The pressure is maintained during the "fusion" stage H - I, typically for 60 seconds during which the ends are joined and the internal and external beads are completed at the joint.

After the "fusion" stage the pressure is released in the ram and the joint cools further for typically 60 seconds.

The regime just described provides a relatively brief heating time ("bead-up" and "soak") and a very short cooling period ("dwell"). The result is that only small beads are formed.

It has been found that the method described above produces a good joint over some 90% of the angular extent of the pipe wall.

The joint being shown by tests to fail only after the pipewall parent material yielded and underwent high elongation.

In the remaining 10% of the wall, alignment was good enough to allow only about two thirds contact at the pipe end interface. However, although tests showed joint failure before pipe wall yield in such parts, the joint strength was still some 75% of the yield strength of the parent pipe wall. Accordingly, the overall strength of the joints was ample for the loads encountered during installation of the liner. Misalignment between the pipe length walls at the interface between their ends is in total angular extent a minor portion of the total angular extent of the pipe length wall. Thus, the tensile strength of the fusion joint is at least equal to the yield strength of the pipe wall over a major portion of the angular extent of the pipe wall and is at least 75% of the yield strength of the pipe wall over a minor portion thereof.

The small external beads at the joints presented negligible resistance to movement of the liner into its installed position. Also, the small internal beads presented negligible resistance to movement of the replacement gas main or other pipe through the liner.

For example, the beads formed during joining of the pipes as described here extend away from the adjacent surface of the pipe wall only some 1.0 mm (0.04 inch).

FIG. 2 shows part of a joint between two lengths of liner pipe formed by the method according to the invention. The distance which either the external or internal bead extends away from the adjacent surface of the pipe wall is represented as "h". The wall thickness of the pipe is "t".

The maximum value of "h" in joints made by the use of the invention is less than "t/2", for either the external or the internal bead.

FIG. 3 shows two characteristics, one as a continuous line for the thin-walled pipe joined using the invention. The other is shown as a broken line for the thick-walled pipe joined by a conventional method. Comparison of FIG. 3 shows how relatively short (preferably not exceeding 25 seconds) is the total time A - F during which the ends of the thin-walled pipes engage the heater body (bead-up plus heat soak) and how relatively short (preferably not exceeding 3 seconds) is the period between separation of the ends from the body and their mutual engagement F - G.

The joints form a complete pressure-resistant seal between the ends all round the pipe so that the invention can be used to make a gas or liquid tight pipe or internal sealing liner for a pipe conveying gas or liquid.

Typically, and preferably, the replacement gas main is made by joining lengths of polyethylene pipe by butt fusion using the same machine as is used to join the lengths of liner pipe or using the same kind of machine.

The regime described with reference to FIG. 3 is given by way of example only. The regime can be modified as required. For example, the "soak" stage can be performed at zero applied pressure. The "bead-up" pressure B - C can be different from instead of equal to, the "fusion" pressure H - I.

In some applications, the joined lengths of pipe may be laid in a passage in the form of a trench. In most cases, though not necessarily all, the lengths will be buried (after installation in such a passage) by infill material deposited in the trench.

I claim:

1. A method for fusion joining, end to end, lengths of pipe liner of the same diameter and wall thickness and made of polyolefin plastic material in which the wall thickness is in the range 2 to 4 millimeters and the ratio of the outside diameter of the pipe liner lengths to wall thickness is at least 40:1, comprising: closing respective aligned circular clamps around lengths of pipe liner adjacent the ends to be joined to reduce non-circularity of the ends, to hold the lengths, and to prevent deformation into oval shape of said ends of said pipe liner under their own weight; trimming the ends to leave trimmed ends more closely adjacent the respective clamps, the trimmed ends being substantially aligned and normal to the lengthwise direction of the lengths; reducing the distance between the clamps to force the trimmed ends against respective opposite faces of a heated body to form initial internal and external beads; reducing the pressure under which the ends engage the body faces; maintaining the ends in engagement with the body faces; separating the clamps to separate the ends from the body; retracting the body; and reducing the distance between the clamps to force the ends into engagement against each other to complete the internal and external beads and to form a strong, fluid-tight fusion joint between said lengths of pipe, the yield strength of said fusion joint being at least equal to the yield strength of the pipe liner wall over a major portion of the angular extent of the pipe liner wall, and being at least 75% of the yield strength of the pipe liner wall over a minor portion of the angular extent thereof, the total time during which the ends from the body and the period between separation of the ends from the body and their engagement against each other being short enough to ensure that the maximum distance which either bead extends away from the adjacent surface of the pipe liner wall is less than half the wall thickness.

2. A method according to claim 1, in which the total time during which the ends engage the body faces does not exceed 25 seconds and the period between separation of the ends from the body and their engagement does not exceed 3 seconds, the ends being forced against each other for at least 30 seconds.

3. A method according to claim 1, in which the ends are forced against the body faces for a period not exceeding 10 seconds and after pressure is reduced the ends are maintained in engagement with the body faces for a period not exceeding 15 seconds.

4. A method according to claim 1 wherein the yield strength of said fusion joint is at least equal to the yield strength of the pipe liner wall over about 90% of the angular extent of the pipe liner wall.

5. Lengths of polyolefin plastic pipe liner joined by a method according to claim 1.

6. A method of installing pipe in an underground passage in which a pipe liner of polyolefin plastic material is first installed in said underground passage for subsequent introduction of said pipe, said method comprising: joining together, end to end, lengths of pipe liner made of polyolefin plastic material having a wall thickness in the range of 2 to 4 millimeters and having an outside diameter:wall thickness ratio of at least 40:1 said lengths of pipe liner being joined at the site by the method of claim 1, and then pulling the joined lengths of pipe liner into said underground passage.

7. A method according to claim 6 wherein said underground passage is formed by bursting a pre-existing underground metal pipe.

8. A method according to claim 7 wherein said pre-existing underground metal pipe is burst by moving a bursting tool therethrough.

9. A method according to claim 8 wherein an end of the joined lengths of pipe liner is attached to said bursting tool whereby the joined lengths of pipe liner are pulled into said underground passage as the bursting tool is moved through said pre-existing underground metal pipe.

10. A method according to claim 6 further comprising installing a pipe within the lengths of joined liner pipe installed in said underground passage.

11. An underground pipe installed in a liner in an underground passage by the method of claim 10.

* * * * *